United States Patent [19]

Lin

[11] 4,382,995
[45] May 10, 1983

[54] MULTI-LAYERED SOLAR HEAT REFLECTING SAFETY GLASS

[76] Inventor: Chii H. Lin, No. 262, Feng Jen Rd., Feng Shan City, Kaohsiung Hsien, China

[21] Appl. No.: 301,578

[22] Filed: Sep. 14, 1981

[51] Int. Cl.³ .................. B32B 17/10; B32B 27/38; B32B 27/30
[52] U.S. Cl. .................... 428/415; 428/417; 428/432; 428/437; 428/701
[58] Field of Search ............. 428/432, 701, 437, 415, 428/417, 413

[56] References Cited

U.S. PATENT DOCUMENTS

| | | | |
|---|---|---|---|
| 3,537,944 | 11/1970 | Grubb | 428/437 |
| 4,170,688 | 10/1979 | Roentgen | 428/432 |
| 4,294,881 | 10/1981 | Meyer | 428/437 |

FOREIGN PATENT DOCUMENTS 5621853 7/1979 Japan .

Primary Examiner—Ellis P. Robinson
Attorney, Agent, or Firm—Tak Ki Sung

[57] ABSTRACT

A multi-layered solar heat reflecting glass, comprising one layer of colored glass and two layers of transparent glass bonded together. One surface of the colored glass is provided with a reflective, metallic oxide film. The external surface of the metallic oxide film is then bonded to a layer of transparent glass using a low water content bonding agent such as epoxy resin adhesive. A second layer of transparent glass is bonded to the other surface of the colored glass by means of a second bonding agent capable of preventing shattering. Alternatively, the oxide film and the bonding agent layer are provided between the two layers of transparent glass, with the colored glass being bonded to one of the external surfaces of the transparent glass.

11 Claims, 3 Drawing Figures

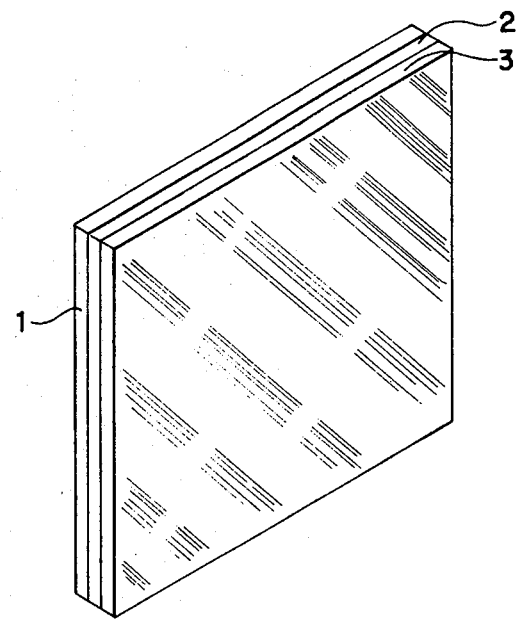
FIG. 1
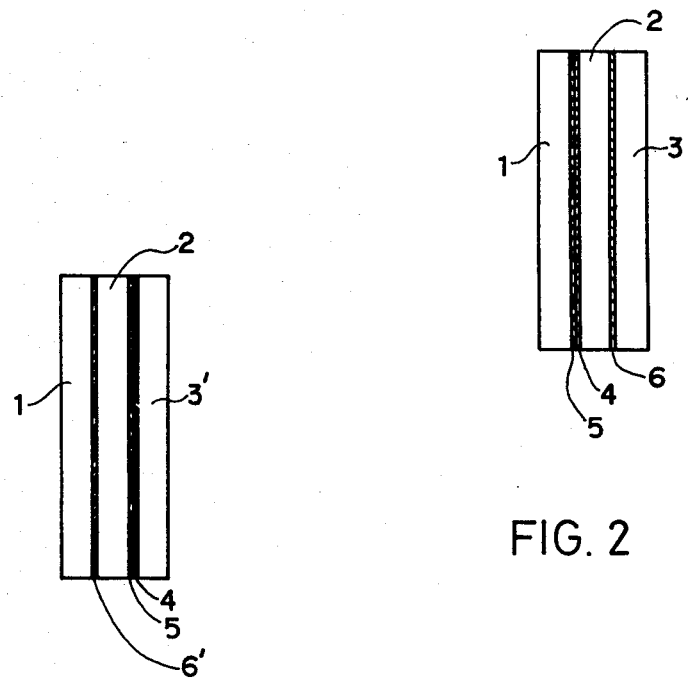
FIG. 2
FIG. 3

MULTI-LAYERED SOLAR HEAT REFLECTING SAFETY GLASS

BACKGROUND OF THE INVENTION

Solar heat reflecting plate glass is increasingly used in contemporary architecture to control the heat gain of internal environments through the glass. To decrease further heat transmission and to increase the aesthetic reflective quality of the glass, a thin metallic oxide film is often deposited on one surface of the glass. Conventional coating methods, however, have numerous shortcomings. When the film is applied to one side of a single layer of glass, the film may be damaged by the abrasion caused by dust when the glass is cleaned or wiped and by the action of the weather. Consequently the film is often deposited on the surface of a layer of glass, which surface is then bonded to a second layer of glass. This protects the film from abrasion and weather. In addition, conventional bonding agents further curtail the tendency of the glass to shatter dangerously when broken. However, the relatively high water content (0.3 to 0.8% by weight) of conventional bonding agents used to curtail shattering tendencies causes chemical reactions which often discolor the film and cause small pin holes to develop in the film.

The objects of the present invention are to eliminate the above mentioned defects, to provide a multi-layered safety solar heat reflecting glass with a metallic oxide film in which the film is protected from abrasion, the action of weather, and discoloring and becoming blurred, and which will not shatter when broken.

DETAILED DESCRIPTION OF THE INVENTION

The purpose and advantage of the present invention will become apparent as it is explained with reference to the appended drawings wherein:

FIG. 1 is a perspective view of an embodiment of the present invention.

FIG. 2 is a cross-sectional view of an embodiment of the present invention, and

FIG. 3 is a cross-sectional view of a second embodiment of the present invention.

In FIG. 1 there is shown the general appearance of a sheet of solar heat reflecting glass laminate of this invention.

As shown in FIG. 2, the laminated glass of the present invention comprises three layers of plate glass 1, 2 and 3 which are bonded together. Glass layer 1 is a colored solar radiant heat absorbing plate glass layer and glass layers 2 and 3 are transparent plate glass. A metallic oxide film 4 is deposited on one surface of glass layer 2. Glass layer 1 is then bonded to the exterior surface of the oxide film 4 by means of first bonding agent 5 having a low water content, such as an epoxy resin adhesive or a thermo-setting type adhesive, to prevent chemical reactions with the metallic oxide film. Examples of the epoxy resin adhesive include Shell Chemical Epikote 828 and for the thermo-setting type adhesive, examples include a mixture of unsaturated polyester resin and epoxy resin. Epikote 828 is an unmodified liquid bisphenol A epichlorohydrin epoxide resin of medium viscosity. Usually, the water content in bonding agent 15 is about 0.02% by weight, preferably from about 0.005 to about 0.02% by weight. The outer surface of glass layer 2 is bonded to glass layer 3 by a second bonding agent 6 capable of preventing the glass from shattering easily, such as polyvinylbutyral adhesive. As the metallic oxide film, oxides of metals such as gold, silver, aluminum, chromium, nickel, copper, platinum, titanium and palladium can be used. In general, the metallic oxide film has a thickness of from about 520 Å to about 1500 Å. Bonding agent 5 is deposited between metallic oxide film 4 and colored glass layer 1 in an amount of from about 0.01 mm to about 0.05 mm, and bonding agent 6, from about 0.38 mm to about 0.76 mm. Glass layers 1, 2 and 3 each has a thickness of from about 3 mm to about 5 mm and these layers usually have the same thickness.

In the first embodiment the second bonding agent 6 is preferably lightly colored.

A second embodiment of the present invention is shown in FIG. 3 in which three layers of plate glass 1, 2 and 3 are bonded together. Glass layer 1 is a colored solar radiant heat absorbing glass and glass layers 2 and 3 are transparent. Metallic oxide film 4 is deposited on to one surface of glass layer 3. Glass layer 2 is then bonded to the outer surface of the metallic oxide layer by means of bonding agent 5 having low water content such as epoxy resin adhesive or thermo-setting type adhesive to prevent chemical reaction with the metallic oxide film. The outer surface of glass layer 2 is bonded to glass layer 1 by bonding agent 6 capable of preventing the glass from shattering easily such as polyvinylbutyral adhesive. Metallic oxides useful in forming layer 4 are the same as previously listed. Similarly, the amounts of bonding agents 5 and 6 used for bonding the glass layers are the same as previously described.

In the second embodiment the second bonding agent 6 is perferably transparent.

According to this invention the metallic oxide film having solar ray reflection characteristics is separated from bonding agents having relatively high water content which prolongs the useful life of the reflective film, and yet the glass laminate is protected from shattering by the shattering-preventing bonding agent which is separated from the reflective film.

What I claim is:

1. A multi-layered solar heat reflecting safety plate glass, comprising a laminate of:
   a first transparent plate glass having one surface coated with a solar heat reflecting metallic oxide film and bonded to a colored solar heat absorbing plate glass by a first bonding agent and the other surface being bonded to a second transparent plate glass by means of a second bonding agent, said second agent being capable of preventing the glass laminate from shattering when broken.

2. A multi-layered solar heat reflecting safety plate glass of claim 1, wherein said first bonding agent has a water content of less than 0.02% by weight.

3. A multi-layered solar heat reflecting safety plate glass of claim 1, wherein said first bonding agent is selected from the group consisting of an epoxy resin based adhesive and a thermo-setting type adhesive.

4. A multi-layered solar heat reflecting safety plate glass of claim 1, wherein said second bonding agent comprises a polyvinylbutyral resin based adhesive.

5. A multi-layered solar heat reflecting safety plate glass of claim 1, wherein said second bonding agent is lightly colored.

6. A multi-layered solar heat reflecting safety plate glass, comprising a laminate of:

a first transparent plate glass having one surface coated with a solar heat reflecting metallic oxide film the other surface of said oxide film being bonded to a second transparant glass by means of a first bonding agent, and a colored solar heat absorbing plate glass bonded to the other surface of said second transparent glass by a second bonding agent, said second bonding agent being capable of preventing the glasses from shattering when broken.

7. A multi-layered solar heat reflecting safety plate glass of claim 6, wherein said first bonding agent has a water content of less than 0.02% by weight.

8. A multi-layered solar heat reflecting safety plate glass of claim 6, wherein said first bonding agent is a thermosetting type adhesive compound or an epoxy resin based adhesive.

9. A multi-layered solar heat reflecting safety plate glass of claim 6, wherein said second bonding agent comprises a polyvinylbutyral resin based adhesive.

10. A multi-layered solar heat reflecting safety plate glass of claim 6, wherein said second bonding agent is transparent.

11. A multi-layered solar heat reflecting safety plate glass of claim 1 or 6, wherein said metallic oxide is selected from the group consisting of the oxides of gold, silver, aluminum, chromium, nickel, copper, platinum, titanium and palladium.

* * * * *